US010479141B2

(12) United States Patent
Bastien

(10) Patent No.: US 10,479,141 B2
(45) Date of Patent: Nov. 19, 2019

(54) FORCE FINGER

(71) Applicant: MONAHAN PRODUCTS, LLC, Rockland, MA (US)

(72) Inventor: Richard M. Bastien, Cumberland, RI (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 0 days.

(21) Appl. No.: 15/902,706

(22) Filed: Feb. 22, 2018

(65) Prior Publication Data

US 2019/0255882 A1    Aug. 22, 2019

(51) Int. Cl.
| B60B 33/00 | (2006.01) |
|---|---|
| B60B 33/02 | (2006.01) |
| B60B 3/14 | (2006.01) |
| B60B 33/04 | (2006.01) |

(52) U.S. Cl.
CPC ............ *B60B 33/023* (2013.01); *B60B 3/145* (2013.01); *B60B 33/0018* (2013.01); *B60B 33/0021* (2013.01); *B60B 33/0039* (2013.01); *B60B 33/045* (2013.01)

(58) Field of Classification Search
CPC ........... B62B 9/082; B62B 9/08; B62B 9/085; B62B 9/087; B60B 33/0065; B60B 33/0068
USPC ................................. 16/20, 38, 39, 37, 35 R
See application file for complete search history.

(56) References Cited

U.S. PATENT DOCUMENTS

| 1,929,743 A * | 10/1933 | Jarvis ................. B60B 33/0002 16/38 |
| 3,197,802 A * | 8/1965 | Fontana ............. B60B 33/0002 16/38 |
| 4,120,071 A * | 10/1978 | Crescenzi .......... B60B 33/0028 16/37 |
| 4,129,921 A * | 12/1978 | Greene ............... B60B 33/0002 16/38 |
| 4,213,226 A * | 7/1980 | Demrick ............. B60B 33/0002 16/36 |
| 4,361,930 A * | 12/1982 | Seesengood ........ B60B 33/0002 16/38 |
| 4,691,889 A * | 9/1987 | Richards ............... F16B 7/0413 16/38 |
| 4,719,664 A * | 1/1988 | Berfield .............. B60B 33/0002 16/38 |

(Continued)

FOREIGN PATENT DOCUMENTS

| DE | 19940779 A1 | 3/2001 |
| WO | 9205968 A1 | 4/1992 |

OTHER PUBLICATIONS

International Search Report and Written Opinion from International Application No. PCT/US2019/018903 dated Jun. 3, 2019.

*Primary Examiner* — Jeffrey J Restifo
(74) *Attorney, Agent, or Firm* — Lando & Anastasi, LLP

(57) ABSTRACT

A child stroller comprises a wheel assembly that includes a wheel disposed on a wheel mount, a wheel bushing including a bore, a pivot pin including an upper end, the pivot pin extending from an upper portion of the wheel mount and into the bore of the wheel bushing, and a force finger disposed in an upper end of the bore and at least partially surrounding and frictionally engaging the upper end of the pivot pin.

21 Claims, 11 Drawing Sheets

(56) References Cited

U.S. PATENT DOCUMENTS

| | | | | |
|---|---|---|---|---|
| 4,720,894 A * | 1/1988 | Deasy | ............... | B60B 33/0002 16/37 |
| 4,731,900 A * | 3/1988 | Frobose | ............ | B60B 33/0002 16/38 |
| 4,793,021 A * | 12/1988 | Deasy | ............... | B60B 33/0002 16/273 |
| 4,805,260 A * | 2/1989 | Tooth | ............... | B60B 33/0002 16/37 |
| 5,052,075 A * | 10/1991 | Harris | ............... | B60B 33/0002 16/38 |
| 5,062,178 A * | 11/1991 | Chiu | ............... | B60B 33/0002 16/30 |
| 5,143,500 A * | 9/1992 | Schuring | ............ | F16B 19/1027 16/38 |
| 5,144,717 A * | 9/1992 | Siesholtz | ............ | B60B 33/0028 16/35 D |
| 5,172,451 A * | 12/1992 | Chiu | ............... | B60B 33/0078 16/29 |
| 5,390,394 A * | 2/1995 | Huang | ............... | B60B 33/0002 16/20 |
| 6,212,733 B1 * | 4/2001 | Yeh | ................ | B60B 33/0002 16/35 R |
| 8,002,363 B2 * | 8/2011 | Cheng | ............... | B60B 33/0002 16/30 |
| 8,850,657 B1 * | 10/2014 | Yang | ................ | B60B 33/0042 16/18 R |
| 9,707,987 B2 * | 7/2017 | Hanson | ................... | B62B 7/06 |
| 9,950,563 B2 * | 4/2018 | Tsai | ................... | B60B 33/0002 |
| 2007/0210544 A1 | 9/2007 | Chen | | |
| 2011/0049967 A1 | 3/2011 | Cheng | | |

* cited by examiner

FORCE FINGER

BACKGROUND

Aspects and examples of the present disclosure are directed generally to child conveyance devices, for example, strollers, and to wheel support assemblies for same. A stroller is generally a chair-like carriage with wheels for transporting a baby or child. Some strollers may include a single seat for receiving a single passenger for transporting. Strollers may include a set of four wheels or may be in a tricycle configuration including three wheels.

SUMMARY

In accordance with some aspects of the present disclosure, there is provided a child stroller. The child stroller comprises a wheel assembly. The wheel assembly includes a wheel disposed on a wheel mount, a wheel bushing including a bore; and a pivot pin including an upper end. The pivot pin extends from an upper portion of the wheel mount and into the bore of the wheel bushing. A force finger is disposed in an upper end of the bore and at least partially surrounds and frictionally engages the upper end of the pivot pin.

In some embodiments, the wheel assembly further includes a locking plate disposed within the wheel bushing and including an aperture, the pivot pin extending through the aperture in the locking plate.

In some embodiments, the pivot pin further includes a groove defined about a circumference thereof. The groove engages a portion of the locking plate when the wheel is locked to the stroller. The groove of the pivot pin may include an upper shoulder and the force finger may bias the upper shoulder of the groove against an upper surface of the locking plate. The groove of the pivot pin may include upper and lower shoulders and a force applied to the pivot pin by the force finger may reduce one of a frequency and an intensity of noise generated by collisions between the shoulders of the groove of the pivot pin and the locking plate as compared to a substantially similar stroller lacking the force finger.

In some embodiments, a force applied to the pivot pin by the force finger reduces wobbling of the wheel during travel of the stroller over a surface as compared to a substantially similar stroller lacking the force finger.

In some embodiments, the force finger includes a substantially cylindrical body and a plurality of internal fingers extending radially inward from an inner surface thereof. The plurality of internal fingers of the force finger may frictionally engage the upper end of the pivot pin. The upper end of the pivot pin may include a frustoconical portion and the internal fingers of the force finger may frictionally engage the frustoconical portion of the pivot pin.

In some embodiments, the upper end of the pivot pin includes a frustoconical portion and the force finger includes a substantially cylindrical body having a lower edge terminating at a height in the bore corresponding to a lower end of the frustoconical portion. The force finger may include an upper edge having a shape corresponding to a shape defined by the bore in an upper surface of the wheel bushing.

In some embodiments, the force finger includes a tab extending outward from an external surface of the pivot pin and engaging a slot defined in an upper surface of the wheel bushing.

In accordance with another aspect, there is provided a wheel assembly for a child stroller. The wheel assembly comprises a wheel bushing including a bore configured to receive a pivot pin extending from an upper portion of a wheel mount for a wheel of the stroller and a force finger disposed in an upper end of the bore. The force finger including a substantially cylindrical body and an engagement element extending radially inward from an internal surface thereof. The engagement element is configured to at least partially surround and frictionally engage an upper end of the pivot pin.

In some embodiments, the wheel assembly further comprises a locking assembly including a locking plate configured to releasably engage a groove defined about a circumference of the pivot pin. The force finger may be configured to bias the pivot pin toward the locking plate.

In some embodiments, the engagement element comprises a plurality of fingers.

In some embodiments, the force finger is rotationally fixed within the bore by a tab extending from an external surface of the force finger and into a receptacle defined in the wheel bushing.

In accordance with another aspect, there is provided a method of reducing noise generated by a wheel assembly of a child stroller. The wheel assembly includes a wheel disposed on a wheel mount, a wheel bushing including a bore, and a pivot pin including an upper end and extending from an upper portion of the wheel mount and configured to be releasably and rotatably retained within the bore of the wheel bushing. The method comprises disposing a force finger in an upper end of the bore. The force finger is configured to at least partially surround and frictionally engage the upper end of the pivot pin.

In some embodiments, the wheel assembly further includes a locking plate and the pivot pin includes a groove having shoulders disposed on opposite sides of a portion of the pivot plate. Disposing the force finger in the upper end of the bore may cause a dampening force to be applied to the upper end of the pivot pin which reduces one of a frequency and an intensity of noise generated by collisions between the shoulders of the groove of the pivot pin and the locking plate as compared to a substantially similar stroller lacking the force finger.

In some embodiments, the force finger includes internal fingers extending radially inward from an internal surface thereof and disposing the force finger in the upper end of the bore includes positioning the fingers in a location in which the fingers will engage the upper end of the pivot pin.

In some embodiments, the method further comprises rotationally fixing the force finger within the bore.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
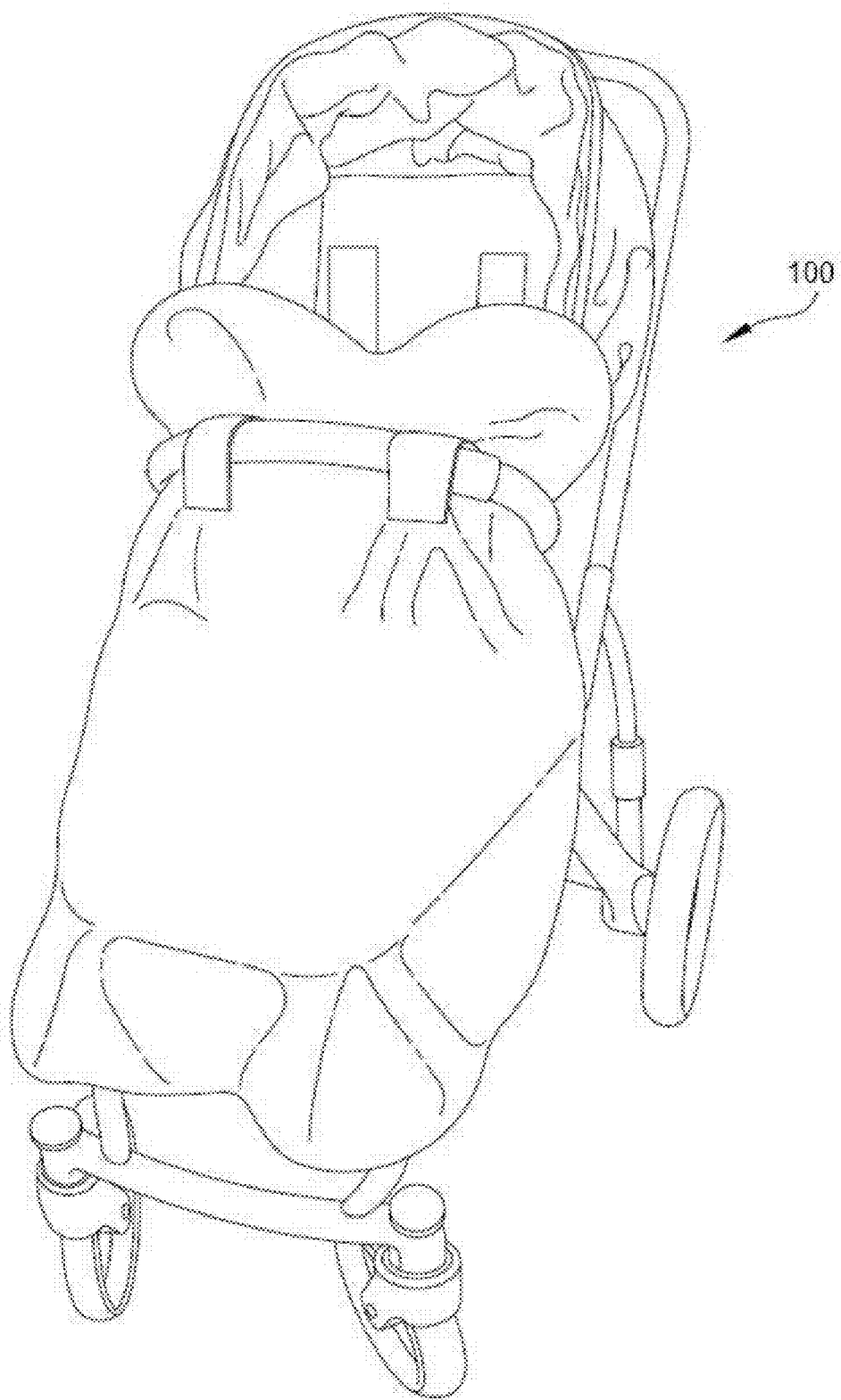
FIG. 1 illustrates a stroller.

The disclosure is not limited in its application to the details of construction and the arrangement of components set forth in the following description or illustrated in the drawings. The disclosure is capable of other examples and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional terms.

Parents or caregivers of young children or babies may transport a child in child conveyance devices, such as strollers. One example of a stroller 100 to which aspects and embodiments disclosed herein may be applicable is illustrated in FIG. 1. It is often desirable that a stroller be transportable across a surface, for example, a sidewalk, road, or floor without producing a significant amount of noise that might upset a child being transported in the stroller or awake the child should the child be sleeping. Aspects and embodiments disclosed herein may address a source of noise that may be present in various models of strollers.

Figure 2:
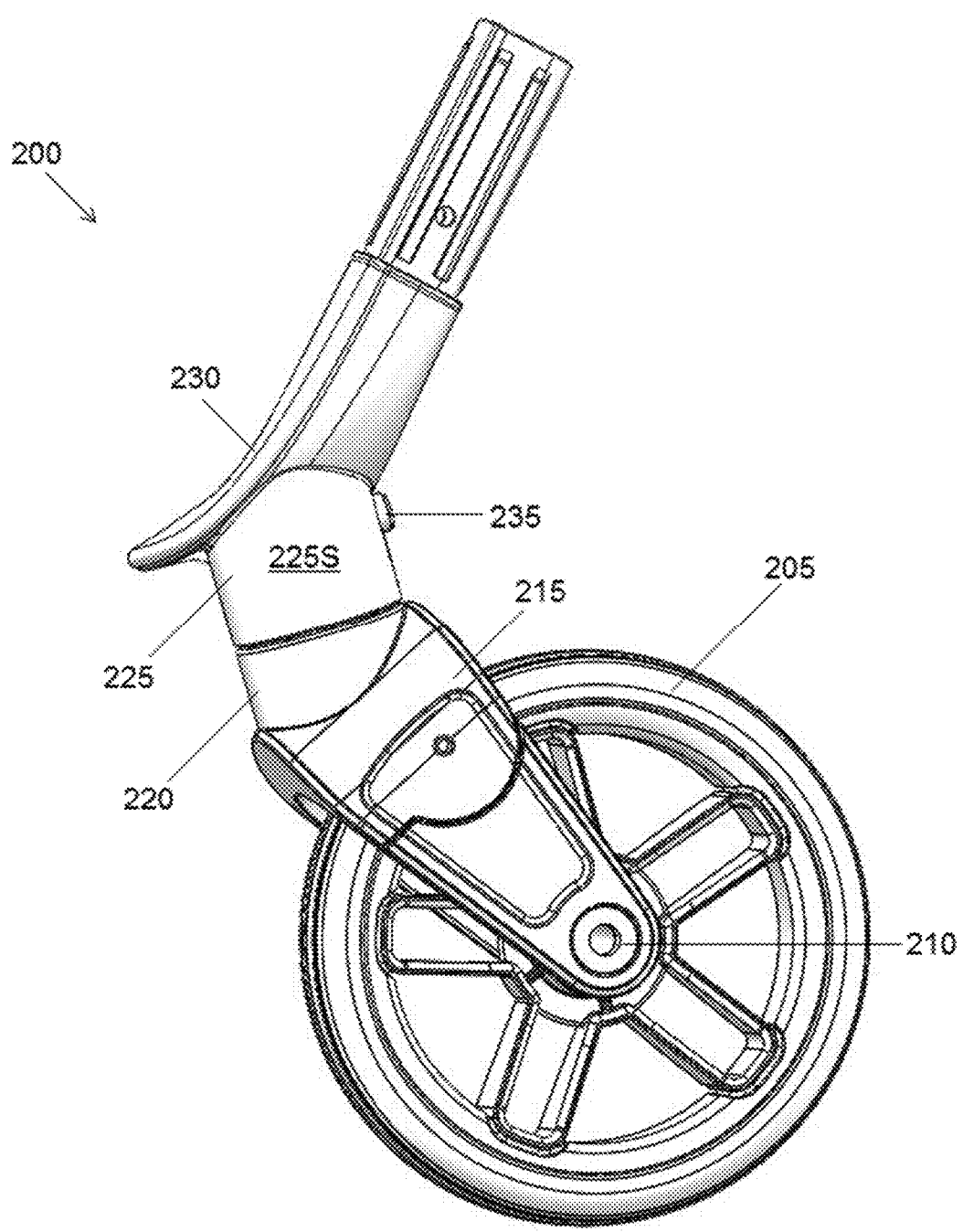
FIG. 2 is an elevational view of an embodiment of a wheel assembly of a stroller.

Some strollers include wheels that may be removable or replaceable, for example, to replace a damaged wheel. FIG. 2 illustrates generally at 200 a front wheel assembly of one example of a stroller. It should be appreciated that the features illustrated in FIG. 2 and the other figures presented herein may be applicable to front and/or rear wheels of strollers. The front wheel assembly 200 includes a wheel 205 that is rotatably secured via an axle 210 to a wheel mount 215. The wheel mount 215 is coupled to or formed integral with a pivot portion 220 that allows the wheel mount 215 and wheel 205 to rotate relative to a front wheel bushing 225. The front wheel bushing 225 is coupled to a front step housing 230 of a stroller, for example, a stroller similar to stroller 100 of FIG. 1. The wheel 205 is removably attached to the stroller. Depression of a release button 235 on the front wheel bushing 225 may allow the pivot portion 220, wheel mount 215, and wheel 205 to be separated from the front wheel bushing 225.

Figure 3:
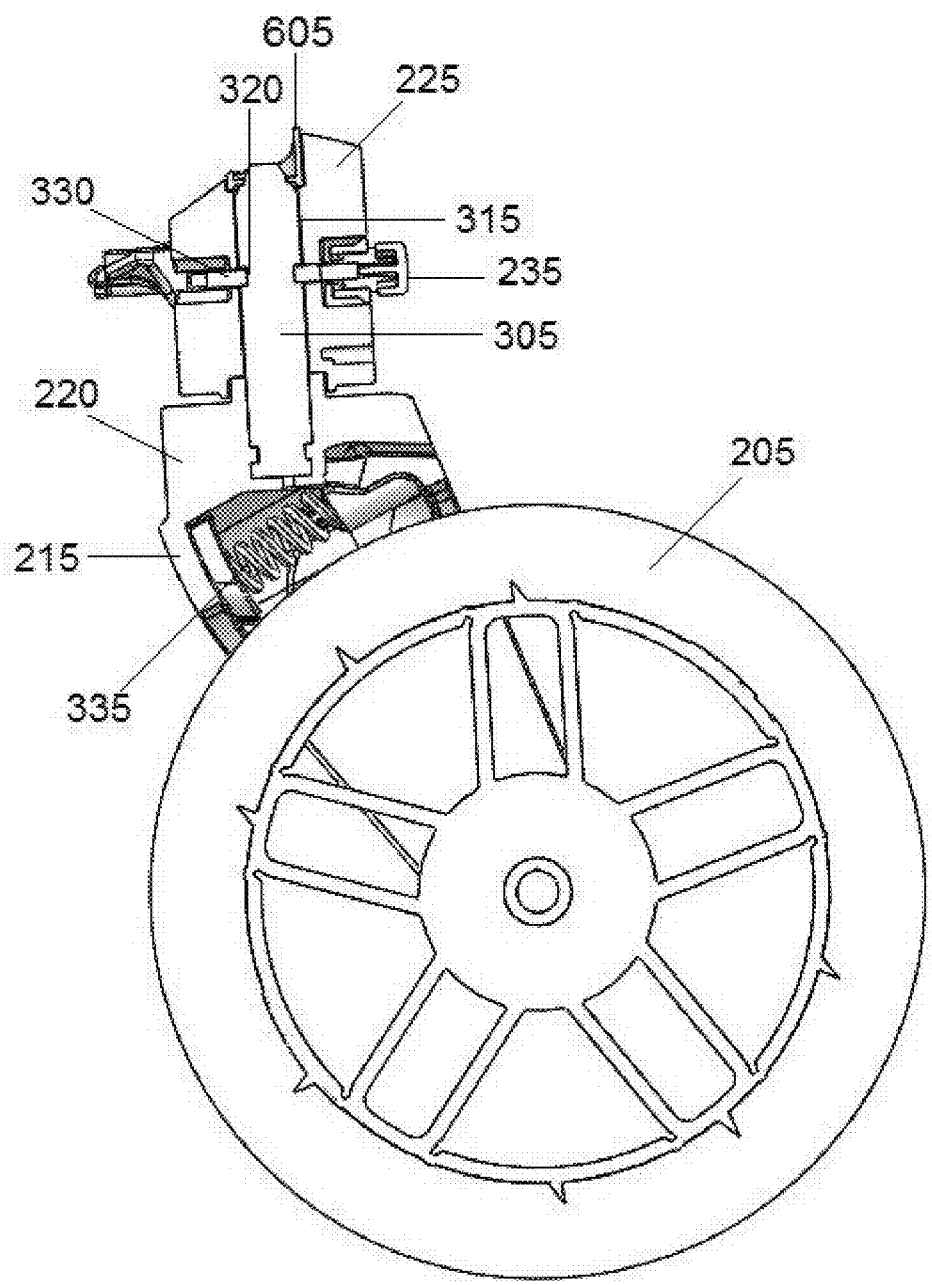
FIG. 3 is a partial cross-sectional view of a portion of the wheel assembly of FIG. 2.

As illustrated in partial cross-section in FIG. 3, a pivot pin 305, which may be formed of a metal, for example, aluminum or steel, is overmolded into the pivot portion 220 of the wheel mount 215. The pivot pin 305 passes from the pivot portion 220 of the wheel mount 215 into a bore 315 defined in the front wheel bushing 225. The pivot pin 305 includes a reduced width region defined by a groove 320 formed in the pivot pin 305. The pivot pin 305 is retained in the bore 315 of the front wheel bushing 225 by engagement of the groove 320 of the pivot pin 305 with an aperture 325 (see FIG. 4) defined in a locking plate 330 that is coupled to the release button 235. The pivot pin 305 is free to rotate within the aperture 325 of the locking plate 330 so that the wheel 205 may rotate relative to the front wheel bushing 225. As also illustrated in FIG. 3, an internal shock absorber 335 may be disposed within the body of the wheel mount 215 to absorb impact force that may be imparted to the wheel 205 if the stroller is pushed over an uneven surface or an obstacle.

Figure 4:
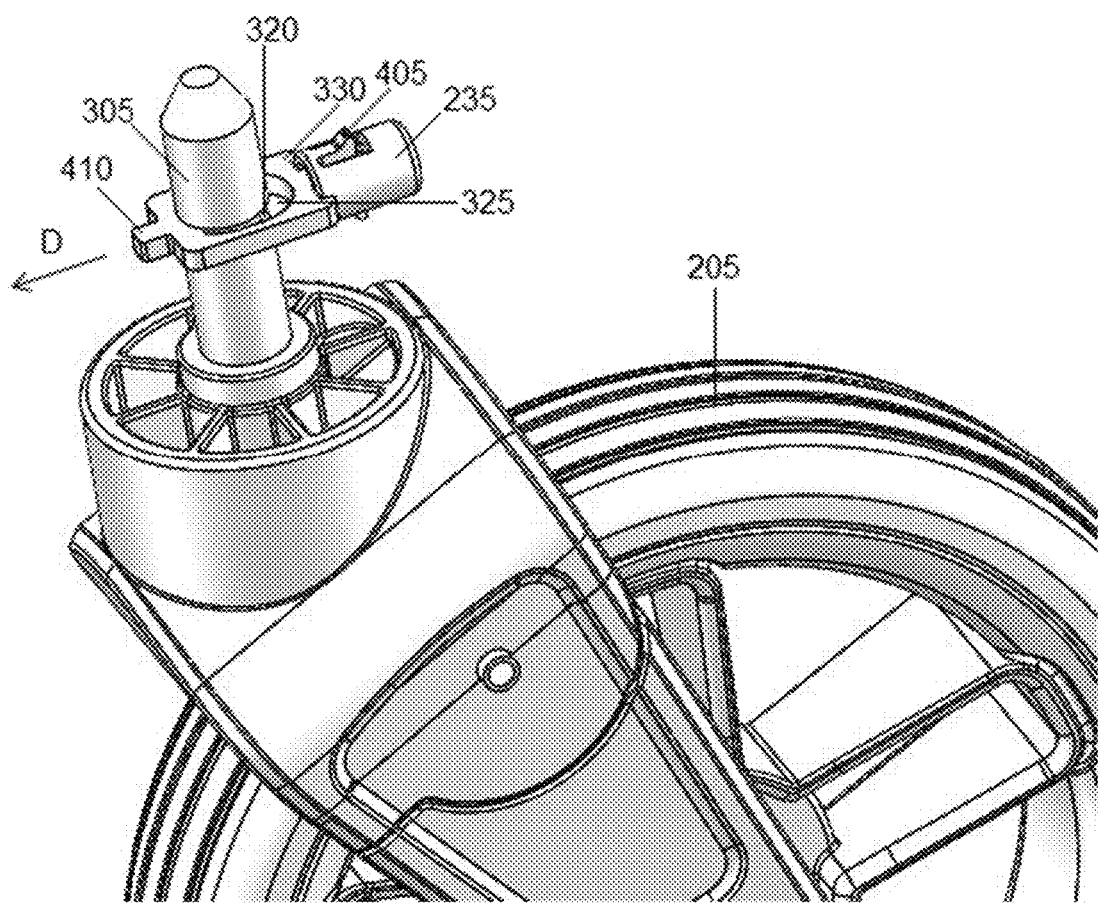
FIG. 4 is a perspective view of internal components of the wheel assembly of FIG. 2.
Figure 5:
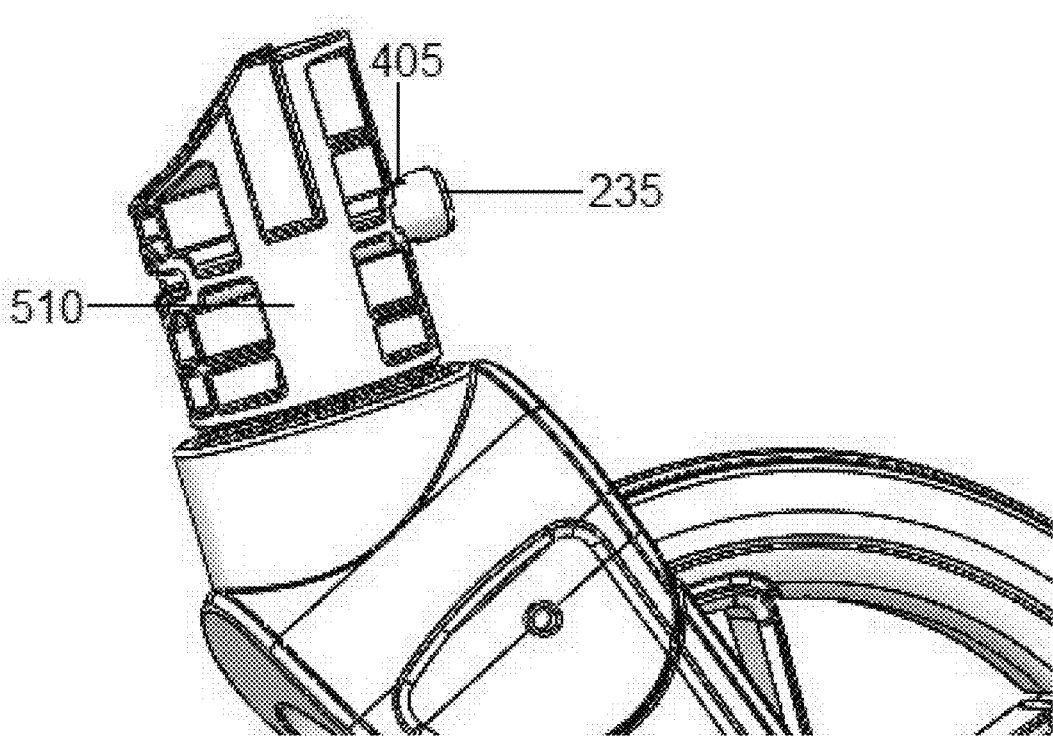
FIG. 5 is a perspective view of a body of a wheel bushing coupled to a wheel mount of the wheel assembly of FIG. 2.
Figure 6:
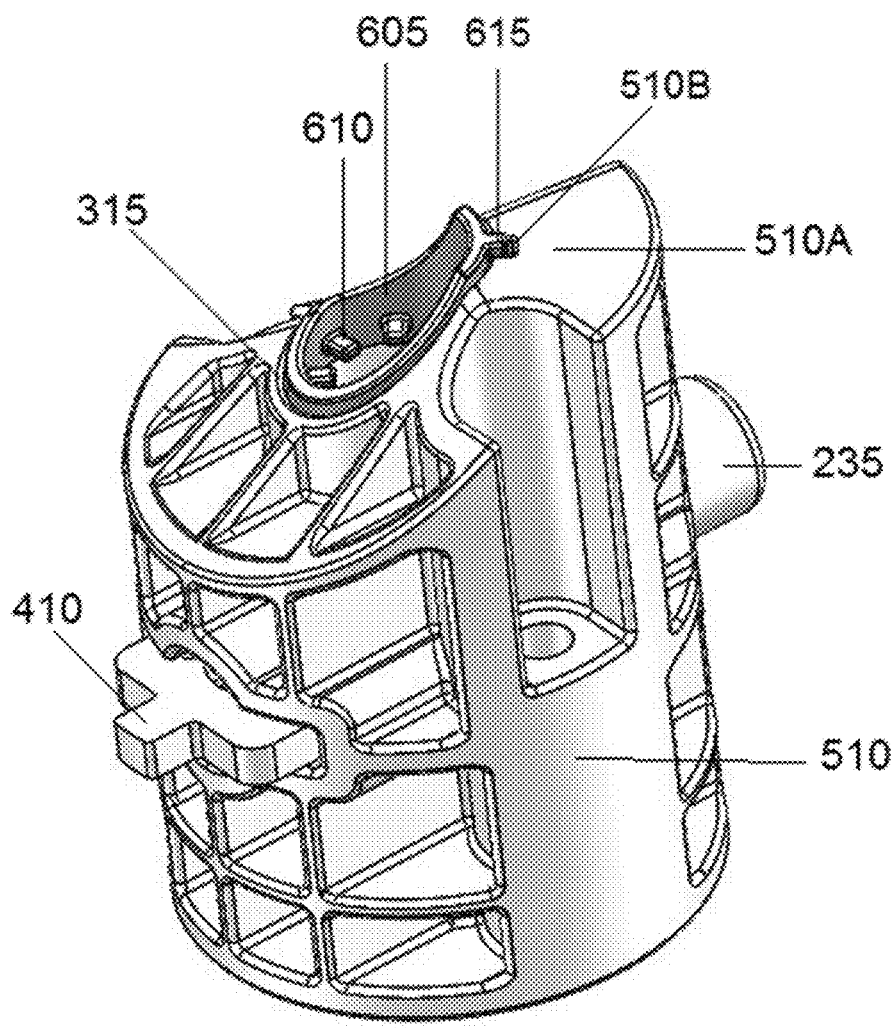
FIG. 6 is an elevational view of a body of a wheel bushing of the wheel assembly of FIG. 2.
Figure 7:
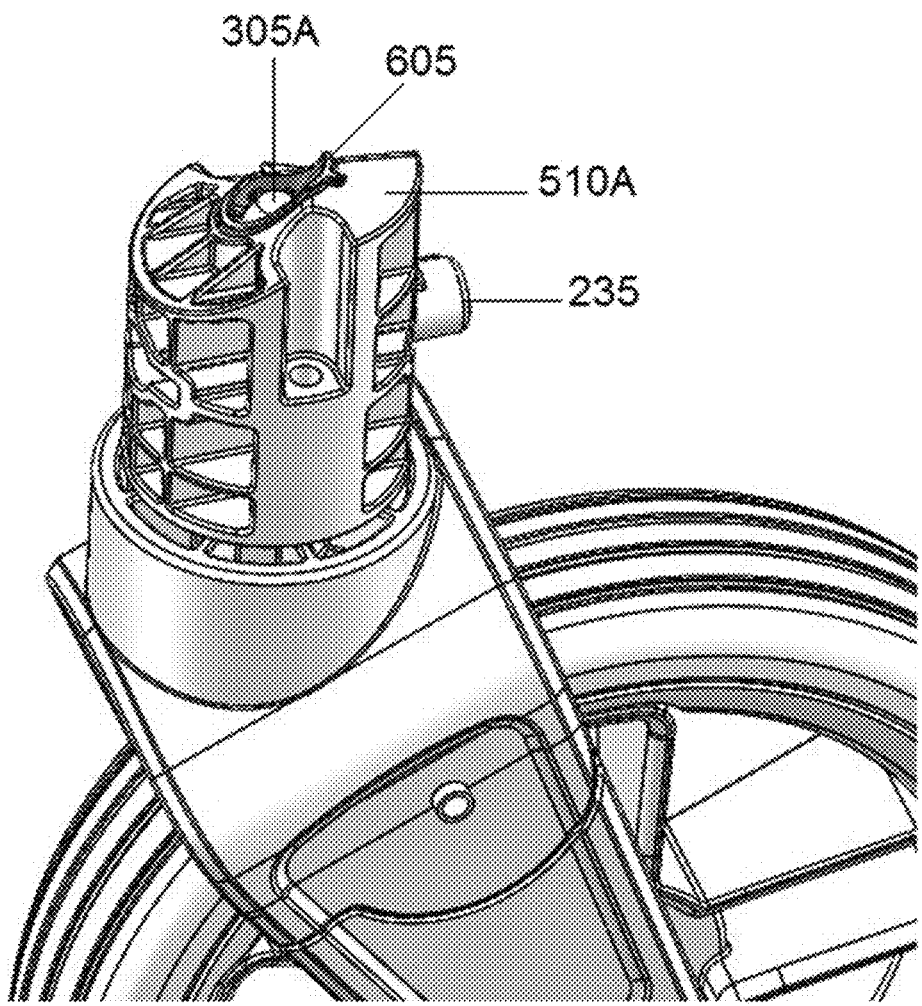
FIG. 7 is a perspective view of a body of a wheel bushing including a force finger and coupled to a wheel mount of the wheel assembly of FIG. 2.
Figure 8:
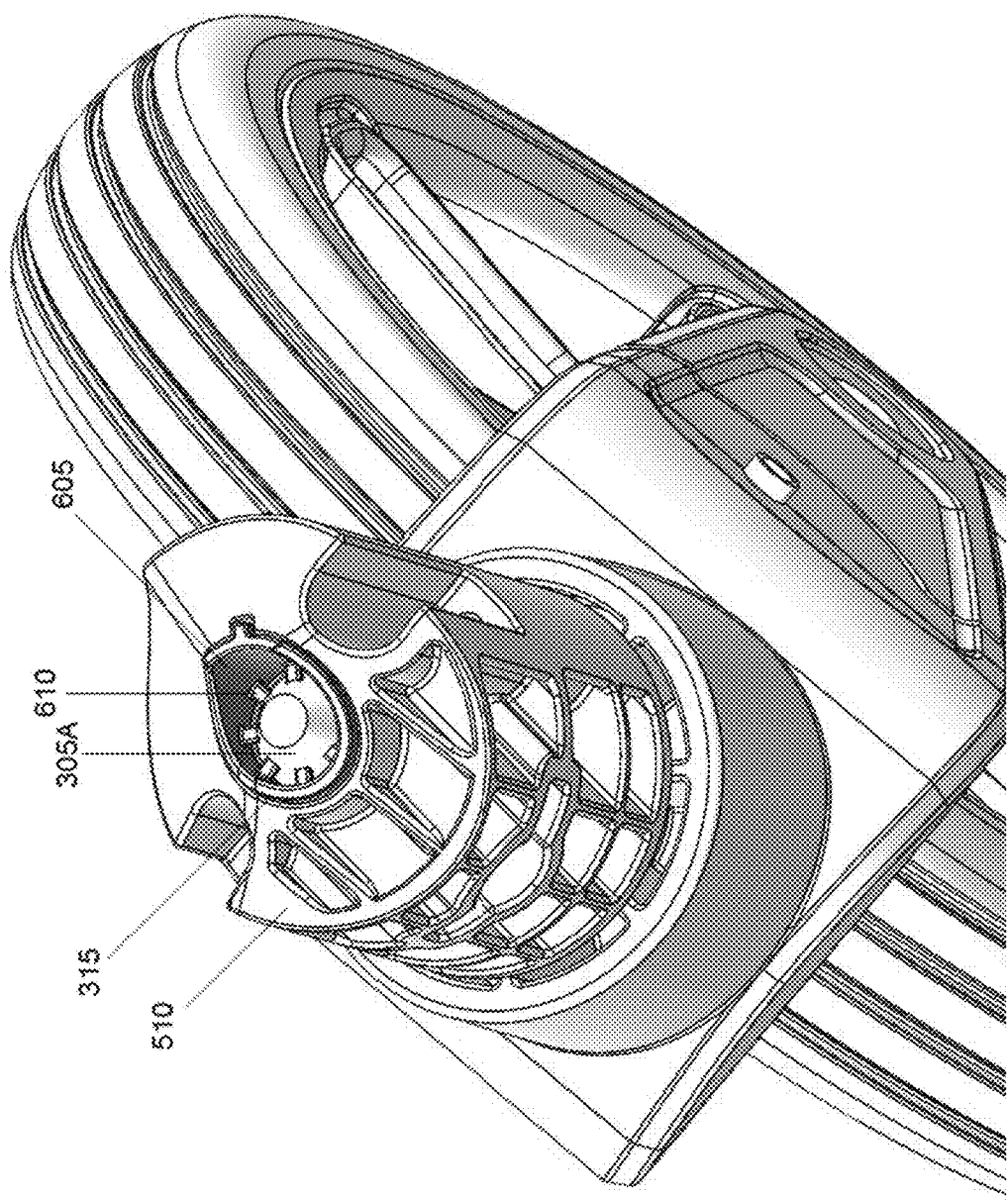
FIG. 8 is a perspective view from the top of a body of a wheel bushing including a force finger and coupled to a wheel mount of the wheel assembly of FIG. 2.

Engagement of the groove 320 of the pivot pin 305 with the aperture 325 defined in the locking plate 330 coupled to the release button 235 is illustrated in FIG. 4. In the position illustrated in FIG. 4, the locking plate 330 is in a locked position in which a portion of the locking plate 330 is disposed within the groove 320 of the pivot pin 305. Pressing on the release button 235 would cause the locking plate 330 to move in the direction indicated by arrow D. Movement of the locking plate 330 in the direction of arrow D causes the portion of the locking plate 330 disposed within the groove 320 of the pivot pin 305 to move out from the groove 320 and allows the pivot pin 305 to pass through the aperture 325 of the locking plate and for the wheel 205 to be removed from the stroller. Absent application of an external force to the release button 235, the release button 235 is urged away from the pivot pin 305 by sloped flexible tabs 405 on the sides of the pivot pin 305 that engage an internal portion of the step housing 230 into which the release button 235 is inserted. Additionally, a compression spring (not shown) is disposed about the locking pin 410 of the locking plate 330 and pushes the locking plate 330 into the locked position illustrated in FIG. 4. Absent application of an external force to the release button 235, the release button 235 and locking plate 330 remain in the locked position illustrated in FIG. 4.

To allow for the pivot pin 305 to rotate within the locking plate 330 when in the locked position without substantial friction the height of the groove 320 of the pivot pin 305 is slightly larger than a thickness of the locking plate 330, for example, by about a few mils (about 0.5 mm or less). This difference in height of the groove 320 of the pivot pin 305 as compared to thickness of the locking plate 330, however, may be a source of noise for the wheel assembly 200. For example, when a stroller including the disclosed wheel assembly is pushed across a low surface the pivot pin 305 may drop downward onto the locking plate 330 causing the upper shoulder 320U (FIG. 11) of the groove 320 of the pivot pin 305 to strike the upper surface of the locking plate 330. Both the pivot pin 305 and locking plate 330 are typically metallic structures, for example, aluminum or steel, so contact between the pivot pin 305 and locking plate 330 may cause a clacking sound to be emitted from the wheel assembly 200. Additionally, when the stroller hits a high surface the pivot pin 305 may be pushed up against the locking plate 330 causing the lower shoulder 320L (FIG. 11) of the groove 320 of the pivot pin 305 to strike the lower surface of the locking plate 330, again causing a clacking noise to be emitted from the wheel assembly 200.

In some embodiments a dampening element may be included in the wheel assembly 200 to help eliminate or reduce the amount or intensity of clacking noise generated by impact between shoulders of the groove 320 of the pivot pin 305 and the locking plate 330. One embodiment of such a dampening element 605 is illustrated in FIGS. 6-11 and is referred to herein as a "force finger." The force finger 605 dampens the relative movement between the pivot pin 305 and the locking plate 330 and reduces or eliminates the sound generated by contact between the two. The force finger 605 may also add a resistance to rotational movement of the pivot pin 305 relative to the front wheel bushing 225 that helps in eliminating wheel wobble.

As illustrated in FIGS. 6-11, the force finger 605 has a substantially cylindrical main body 605A having an outer diameter that provides for the force finger 605 to be disposed snugly within an interior of an upper portion of the bore 315 in the internal body 510 of the front wheel bushing 225. In some embodiments, the outer diameter of the force finger 605 and inner diameter of the upper portion of the bore 315 are sufficiently matched to prevent the force finger 605 from rotating within the upper portion of the bore 315 due to friction. In some embodiments, the force finger 605 includes a tab 615 protruding outwardly from the outer surface thereof that engages a corresponding receptacle defined in the wheel bushing, for example a slot 510B formed in the upper surface 510A of the internal body 510 of the front wheel bushing 225 (FIG. 6) to further prevent the force finger 605 from rotating within the bore 315. The force finger includes an upper edge 605C (FIG. 9) that is shaped to match the contours of the opening of the bore 315 in the upper surface 510A of the internal body 510 of the front wheel bushing 225 and a substantially flat, substantially circular lower edge 605B.

Figure 9:
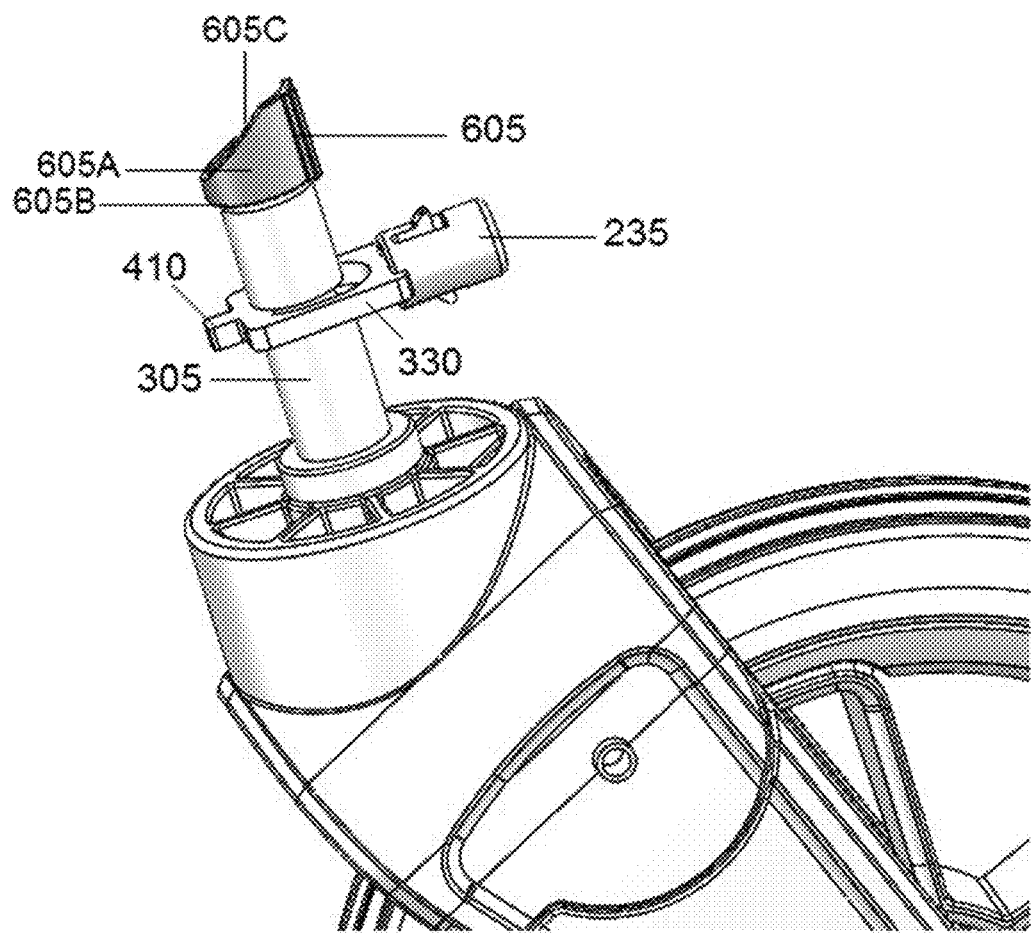
FIG. 9 is a perspective view of internal components of the wheel assembly of FIG. 2, including a force finger.
Figure 10:
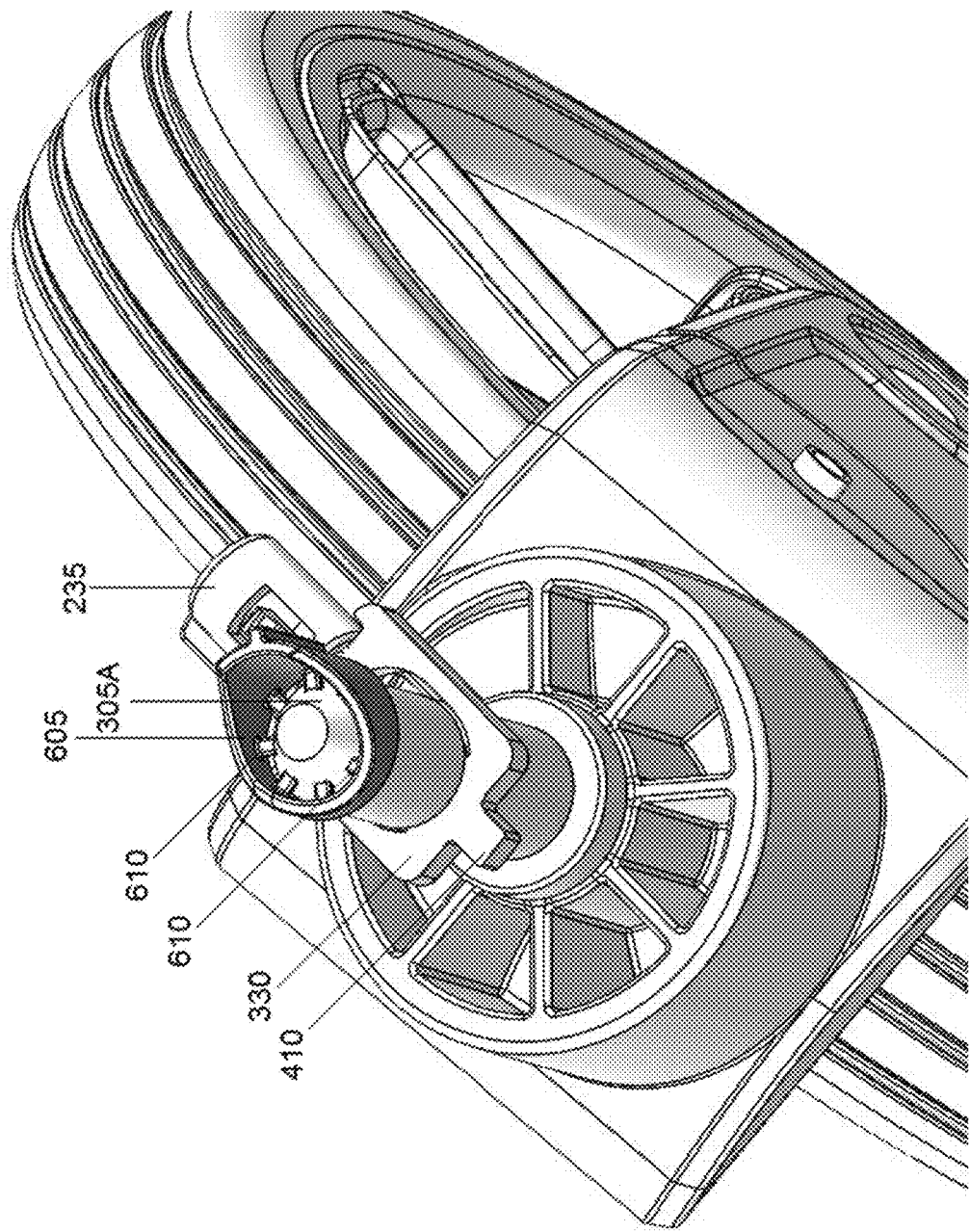
FIG. 10 is a perspective view from the top of the internal components of the wheel assembly of FIG. 9.

The force finger 605 may include a plurality of internal fingers 610, for example, between about 8 and about 12 fingers, extending radially inward from an internal surface of the force finger 605. The plurality of internal fingers 610 may be coplanar in a plane defined normal to a longitudinal axis of the force finger 605, bore 315, and/or pivot pin 305. The internal fingers 610 contact sloped portions of a frustoconical end portion 305A of the pivot pin 305. The internal fingers 610 of the force finger 605 may bias the pivot pin 305 downward against the locking plate 330 and may damper relative motion between the pivot pin 305 and locking plate 330. The lower edge 605B of the force finger 605 may be disposed at or within a few mils (about 1.5 mm or less) above (or in an alternate embodiment, below) a transition between the frustoconical end portion 305A of the pivot pin 305 and a straight sidewall portion of the pivot pin 305 (FIG. 9). Friction between the internal fingers 610 of the force finger 605 and the frustoconical end portion 305A of the pivot pin 305 may dampen motion of the pivot pin 305 in both an upward and downward direction and reduce the frequency and/or intensity of collisions between shoulder portions 320U, 320L of the groove 320 of the pivot pin 305 and corresponding surfaces of the locking plate 330.

The materials of construction of the wheel assembly 200 and force finger 605 are not limited to any particular materials. In some embodiments, the force finger 605 is formed from a material that may frictionally engage the metal pivot pin 305. The force finger 605 may be formed of a resilient material, for example, rubber or nylon. The force finger 605 may be formed of the same material as one or more other portions of the wheel assembly 200, for example, the wheel mount 215 or wheel bushing 225.

Figure 11:
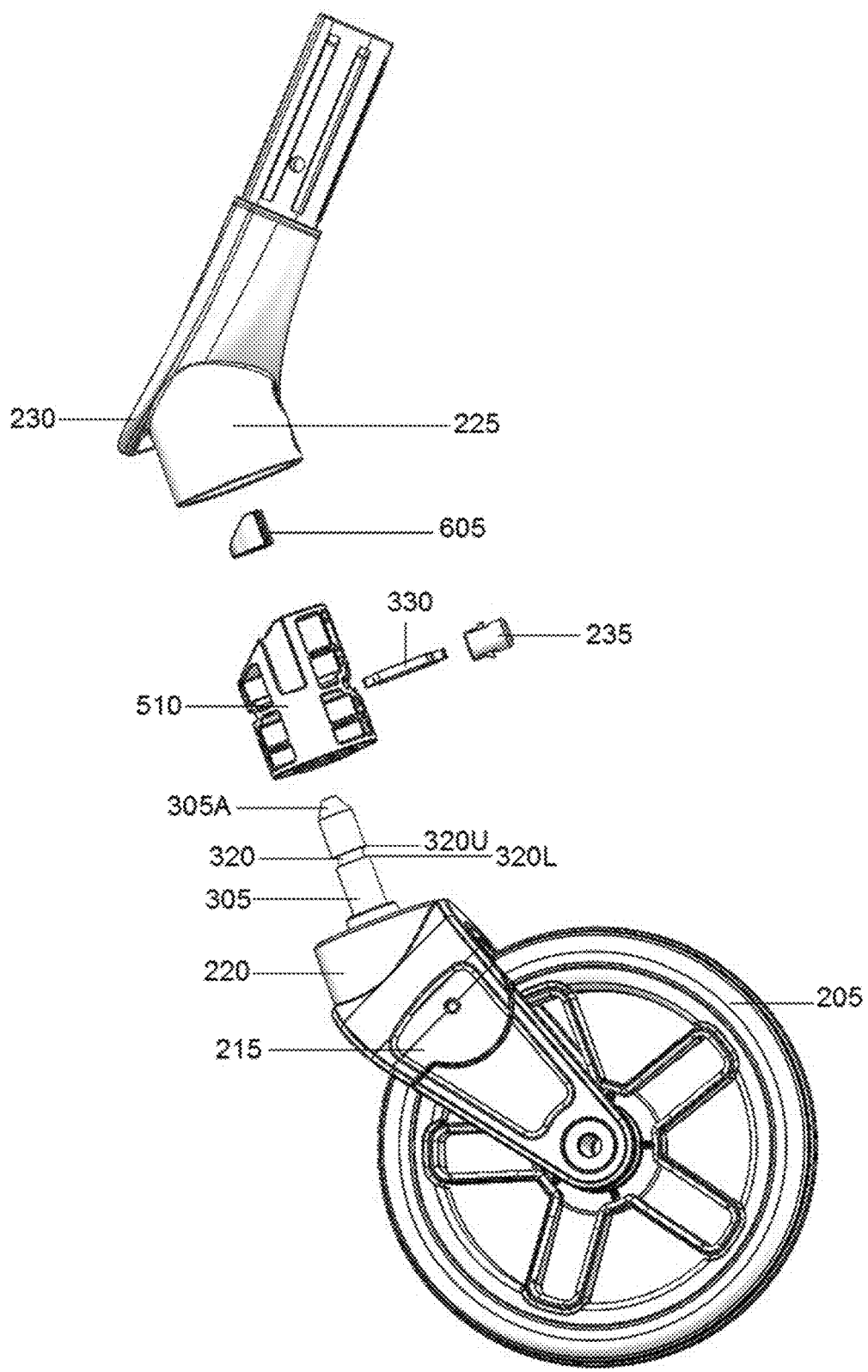
FIG. 11 is an exploded view of the wheel assembly of FIG. 2.

A method of assembling a wheel assembly 200 of a stroller may include at least the following: The internal body 510 of the front wheel bushing 225 is assembled by inserting the locking plate 330 in a corresponding slot in the internal body 510 of the front wheel bushing 225, followed by attaching a compression spring to the locking pin 410. A force finger 605 as disclosed herein is inserted into the upper portion of the bore 315 of the internal body 510 of the front wheel bushing 225. The assembled internal body 510 of the front wheel bushing 225 is attached to the front step housing 230 of the stroller with fasteners, for example, screws or bolts within an outer shell 225S (FIG. 2) of the front wheel bushing 225, forcing the force finger 605 to be sandwiched between the internal body 510 of the front wheel bushing 225 and the front step housing 230. The release button 235 is then mounted on the end of the locking pate 330 opposite the locking pin 410 through the outer shell 225S of the front wheel bushing 225. A wheel 205 coupled to a wheel mount 215 including a pivot pin 305 extending therefrom (for example, as illustrated in FIG. 11) may be joined to the stroller by inserting the pivot pin 305 into a lower end of the bore 315 and pushing the pivot pin 305 into the bore 315 until a groove 320 formed in the pivot pin 305 engages the locking plate 330 and locks the wheel 205 onto the stroller.

Having thus described several aspects of at least one embodiment of this disclosure, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:
1. A child stroller comprising:
 a wheel assembly including:
  a wheel disposed on a wheel mount;
  a wheel bushing including a bore;
  a pivot pin including an upper end portion including a sloped side that is sloped relative to a side of a lower portion of the pivot pin, the pivot pin extending from an upper portion of the wheel mount and into the bore of the wheel bushing; and
  a force finger disposed in an upper end of the bore and at least partially surrounding and frictionally engaging the sloped side of the upper end portion of the pivot pin.

2. The stroller of claim 1, wherein the wheel assembly further includes a locking plate disposed within the wheel bushing and including an aperture, the pivot pin extending through the aperture in the locking plate.

3. The stroller of claim 2, wherein the pivot pin further includes a groove defined about a circumference thereof, the groove engaging a portion of the locking plate when the wheel is locked to the stroller.

4. The stroller of claim 3, wherein the groove of the pivot pin includes an upper shoulder and the force finger biases the upper shoulder of the groove against an upper surface of the locking plate.

5. The stroller of claim 3, wherein the groove of the pivot pin includes upper and lower shoulders and a force applied to the pivot pin by the force finger reduces one of a frequency and an intensity of noise generated by collisions between the shoulders of the groove of the pivot pin and the locking plate.

6. The stroller of claim 1, wherein a force applied to the pivot pin by the force finger reduces wobbling of the wheel during travel of the stroller over a surface.

7. The stroller of claim 1, wherein the force finger includes a substantially cylindrical body and a plurality of internal fingers extending radially inward from an inner surface thereof.

8. The stroller of claim 7, wherein the plurality of internal fingers of the force finger frictionally engage the sloped side of the upper end portion of the pivot pin.

9. The stroller of claim 8, wherein the upper end portion of the pivot pin includes a frustoconical portion and the internal fingers of the force finger frictionally engage the frustoconical portion of the pivot pin.

10. The stroller of claim 1, wherein the upper end portion of the pivot pin includes a frustoconical portion and the force finger includes a substantially cylindrical body having a lower edge terminating at a height in the bore corresponding to a lower end of the frustoconical portion.

11. The stroller of claim 10, wherein the force finger includes an upper edge having a shape corresponding to a shape defined by the bore in an upper surface of the wheel bushing.

12. The stroller of claim 1, wherein the force finger includes a tab extending outward from an external surface of the pivot pin and engaging a slot defined in an upper surface of the wheel bushing.

13. A wheel assembly for a child stroller, the wheel assembly comprising
   a wheel bushing including a bore configured to receive a pivot pin extending from an upper portion of a wheel mount for a wheel of the stroller; and
   a force finger disposed in an upper end of the bore, the force finger including a substantially cylindrical body and an engagement element extending radially inward from an internal surface thereof, the engagement element configured to at least partially surround and frictionally engage a sloped surface of an upper end portion of the pivot pin that is sloped relative to a side of a lower portion of the pivot pin.

14. The wheel assembly of claim 13, further comprising a locking assembly including a locking plate configured to releasably engage a groove defined about a circumference of the pivot pin.

15. The wheel assembly of claim 14, wherein the force finger is configured to bias the pivot pin toward the locking plate.

16. The wheel assembly of claim 13, wherein the engagement element comprises a plurality of fingers.

17. The wheel assembly of claim 13, wherein the force finger is rotationally fixed within the bore by a tab extending from an external surface of the force finger and into a receptacle defined in the wheel bushing.

18. A method of reducing noise generated by a wheel assembly of a child stroller, the wheel assembly including a wheel disposed on a wheel mount, a wheel bushing including a bore, and a pivot pin including an upper end portion having a sloped side surface that is sloped relative to a side of a lower portion of the pivot pin and extending from an upper portion of the wheel mount and configured to be releasably and rotatably retained within the bore of the wheel bushing, the method comprising disposing a force finger in an upper end of the bore, the force finger configured to at least partially surround and frictionally engage the sloped side surface of the upper end portion of the pivot pin.

19. The method of claim 18, wherein the wheel assembly further includes a locking plate and the pivot pin includes a groove having shoulders disposed on opposite sides of a portion of the pivot plate and wherein disposing the force finger in the upper end of the bore causes a dampening force to be applied to the upper end portion of the pivot pin which reduces one of a frequency and an intensity of noise generated by collisions between the shoulders of the groove of the pivot pin and the locking plate.

20. The method of claim 18, wherein the force finger includes internal fingers extending radially inward from an internal surface thereof and disposing the force finger in the upper end of the bore includes positioning the fingers in a location in which the fingers will engage the sloped side surface of the upper end portion of the pivot pin.

21. The method of claim 18, further comprising rotationally fixing the force finger within the bore.

\* \* \* \* \*